Jan. 19, 1937.  J. H. SHERTS  2,068,082

LAMINATED GLASS AND PROCESS OF MAKING THE SAME

Filed June 8, 1935

INVENTOR.
JAMES H. SHERTS
BY
ATTORNEYS.

Patented Jan. 19, 1937

2,068,082

UNITED STATES PATENT OFFICE 2,068,082

LAMINATED GLASS AND PROCESS OF MAKING THE SAME

James H. Sherts, Tarentum, Pa., assignor to Duplate Corporation, a corporation of Delaware Application June 8, 1935, Serial No. 25,659

2 Claims. (Cl. 49—81)

Figure 1:
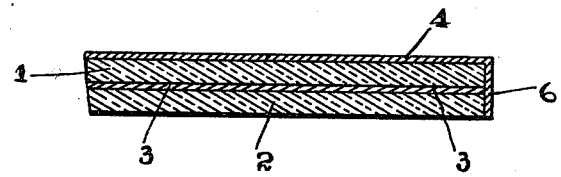
Figure 2:
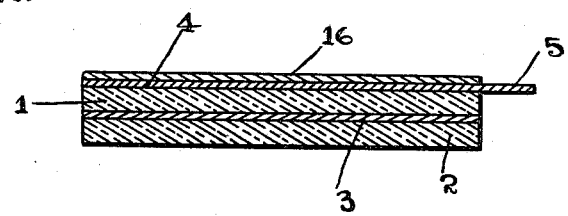
Figure 3:
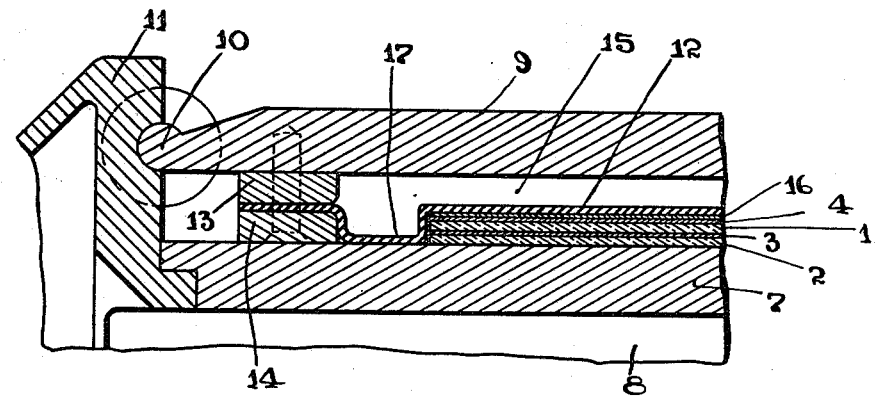
Figure 4:
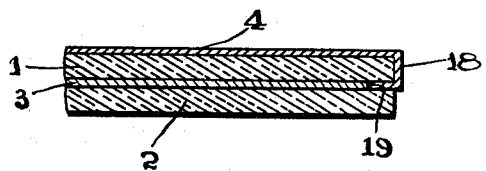

The invention relates to laminated or safety glass which ordinarily consists of a pair of thin glass sheets cemented to the opposite sides of a sheet of reinforcing material, such as cellulose plastic or synthetic resin. The present invention relates to the addition to the outer face of one of the glass sheets, of a second sheet of reinforcing material of the character above indicated, the product thus formed being of particular utility in windshields and the like to protect the operator behind the windshield from small particles of glass which may be spalled off the rear face of the windshield due to the impact of a pebble or projectile on the front side of the shield. The objects of the invention are the provision of an improved product of the character described, which will add to the strength and safety of the laminated plates, and the provision of an improved process whereby the laminated plates may be produced of satisfactory quality and at reasonable cost. The article and process are illustrated in the accompanying drawing, wherein:

Figure 1 is a section through a laminated plate constructed in accordance with my invention, the thickness of the various sheets or layers being exaggerated for the sake of clearness. Fig. 2 is a section of a laminated plate showing the assembly prior to the pressing operation. Fig. 3 is a partial section through one form of press which may be employed in practicing the process. And Fig. 4 is a section similar to that of Fig. 1, but illustrating a modification.

Referring to the article as illustrated in Fig. 1, 1 and 2 are glass sheets which are secured to the opposite sides of a sheet of non-shatter reinforcing material 3, such as cellulose nitrate or a synthetic resin, a cement, such as gelatin being preferably used to secure the sheets together, although it will be understood that in some cases the reinforcing sheet is itself of such character that no cement is required in order to secure the three sheets together by heat and pressure. Extending over the outer face of one of the glass sheets is a second sheet of reinforcing material 4 which may be of the same composition as the sheet 3 or a different composition. If this sheet is cellulose nitrate, it is preferably cemented to the sheet 1 by means of gelatin or other suitable cement, although in some cases the reinforcing may be of such character that it will adhere to the glass without the use of cement when heat and pressure are applied. This adhesion may be secured without cement in case the reinforcing sheet is a synthetic resin, such as vinyl acetyl. The sheet 4 is preferably of greater size than the glass sheets 1 and 2 so that a margin 5 (Fig. 2) is provided which can be turned down past the side edges of the glass sheets 1 and 2, forming the flange 6, as indicated in Fig. 1. The turning down operation may occur as a part of the operation of attaching the sheet 4 to the sheet 1, as later described, or may be accomplished by a separate operation after the sheet 4 has been attached to the sheet 1. Cement may be employed to hold the flange 6 against the side edges of the glass sheets, although in some cases this may not be necessary. The flanges 6 add to the security with which the sheet 4 is attached to the sheet 1 and also serve to protect the edges of the glass sheets and act as a seal around the edges of the reinforcing sheet 3. The use of this additional reinforcing sheet 4 adds to the strength of the laminated plate and gives protection against particles of glass which might be spalled off of the outer face of the glass sheet due to the impact of a pebble or projectile on the face of the glass sheet 2. It will be understood that in the use of the laminated plate as a windshield, the protecting sheet 4 is on the side of the windshield next to the driver.

Fig. 3 illustrates a press and method which may be employed in securing the attachment of the sheet 4 to the sheet 1 by the application of heat and pressure. The press shown in Fig. 3 is similar to that disclosed in Fix and Dennison Patent No. 1,956,168, dated April 24, 1934. This press involves the use of a platen 7 which is heated by the application of steam to the chamber 8 beneath the platen, and a lid 9 pivoted at 10 to the side 11 of the press. This lid carries a rubber diaphragm 12 clamped between the strips 13 and 14 which are secured to the cover, the diaphragm being spaced away from the cover to provide the pressure chamber 15. In carrying out the operation, a previously laminated plate made up of the glass sheets 1 and 2 and the reinforcing sheet 3 is prepared for the attachment of the sheet 4 preferably by coating the face of the sheet 1 with a suitable cement, such as gelatin. The reinforcing sheet 4 is then applied, as indicated in Fig. 2, with its edges projecting out past the side edges of the plate 1, and a thin sheet of highly polished metal 16, such as nickel and of the same size as the glass sheet 1, is applied, as indicated in Fig. 2.

The sandwich as thus prepared is placed on the platen 7 of the press, and after the lid 9 is moved to closed position, the platen 7 is heated by steam in the chamber 8, and air pressure is applied in the space 15 above the diaphragm. The degree of heat which is supplied will depend upon the character of the reinforcing sheet 4, and is in all cases sufficient to soften the sheet. In the case of cellulose nitrate, the temperature required for softening the sheet is slighly above 200 deg. F. The pressure which is applied in the chamber 15 will also depend upon the character of the reinforcing sheet and will ordinarily range from 50 to 150 pounds per square inch. Good results are secured using a pressure of about 80 pounds when cellulose nitrate is used as the reinforcing material. The application of pressure in the chamber 15 causes the diaphragm to move down around the edge of the glass sheets somewhat as indicated at 17 in Fig. 3, thus folding the edge 5 of the reinforcing sheet 4 down, so as to form the flange 6 heretofore referred to. The side edges of the glass sheets may be covered with a cementing material, such as gelatin in the same manner as the upper face of the sheet 1 in order to provide a more secure attachment of the flanges 6 to the glass sheets. As pointed out in the patent heretofore referred to, it is ordinarily desirable to exhaust the air from beneath the diaphragm, preliminary to the pressing operation as above described, in order to get rid of any air between the faces of the sheets 1 and 4, this being a detail of operation which is well known in the art in ordinary laminating operations.

After the laminating operation as above described is completed, the press is opened, the sandwich is removed, and the thin metal plate 15 is removed from the plate 4, thus completing the operation. The use of the polished plate 16 is important as it serves to polish the upper face of the sheet 4, thus insuring transparency. When this plate 16 is used, it is possible to employ sheets 4 of reinforcing material which do not have polished surfaces, and which are relatively cheaper than reinforcing sheets if supplied by the manufacturer with polished surfaces. In case the sheet 4 is of highly plasticized material or resin, which will adhere to the glass without the use of any cement, an adherence is also secured in the pressing operation between the reinforcing sheet and the metal plate, but in this case little difficulty is experienced in freeing the metal sheet because of its flexibility. A separation may readily be started at one edge or corner, and the sheet then peeled away from the reinforcing sheet. In the case of those reinforcing materials which tend to adhere too tightly to the nickel plate, this difficulty may be overcome by using a soap solution on the face of the nickel plate before it is applied.

Fig. 4 illustrates a modification in which the reinforcing sheet 4 is provided with a flange 18 which extends into a groove around the edge of the reinforcing sheet 3, as indicated at 19. The groove around the edge of the sheet 3 is ordinarily provided in laminated plates for sealing purposes, and as indicated in Fig. 4, this groove may be utilized in part or in whole to receive the edge of the flange 19, thus adding somewhat to the security of the attachment of the plate 4 to the laminated plate thereunder.

It will be understood that the terms "cemented" and "cementing", as used in the claims with reference to the joinder of the glass and reinforcing sheets, is intended to cover adhesion due to the character of the reinforcing itself, as well as adhesion due to the use of a separate adhesive between the sheets.

What I claim is:

1. In combination, a laminated plate comprising a reinforcing sheet of non-shatter material, a pair of glass sheets cemented to the opposite sides of the reinforcing sheet, and a second reinforcing sheet of non-shatter material cemented to the outer face of one of the glass sheets, said last reinforcing sheet being of the same shape but of larger size than the glass sheets and having its edges bent inward at right angles to the body of the sheet so as to cover the side edges of both of the glass sheets.

2. A process of attaching a transparent reinforcing sheet of non-shatter material to a plate of laminated glass made up of a pair of glass sheets with a sheet of reinforcing material therebetween which consists in placing said transparent sheet of the same shape as the glass sheets but of greater size upon one of the glass sheets with one of the opposing surfaces of the glass and transparent sheets adapted to give adhesion on the application of heat and pressure, placing a sheet of thin polished metal of the same size as the glass sheets upon the transparent sheet, applying a flexible diaphragm over the sandwich thus formed, heating the sandwich sufficient to soften the transparent sheet, and applying fluid pressure behind the diaphragm so as to cause the attachment of the transparent sheet to the glass sheet on which it rests and to bend the edges of the transparent sheet at right angles over the side edges of the glass sheet.

JAMES H. SHERTS.